United States Patent
Willett, Jr.

(10) Patent No.: US 11,286,800 B2
(45) Date of Patent: Mar. 29, 2022

(54) GAS TURBINE AND SPACER DISK FOR GAS TURBINE

(71) Applicant: Mechanical Dynamics & Analysis LLC, Latham, NY (US)

(72) Inventor: Fred Thomas Willett, Jr., Burnt Hills, NY (US)

(73) Assignee: Mechanical Dynamics & Analysis LLC, Latham, NY (US)

(*) Notice: Subject to any disclaimer, the term of this patent is extended or adjusted under 35 U.S.C. 154(b) by 47 days.

(21) Appl. No.: 16/797,823

(22) Filed: Feb. 21, 2020

(65) Prior Publication Data

US 2021/0262348 A1 Aug. 26, 2021

(51) Int. Cl.
*F01D 11/00* (2006.01)
*F01D 5/06* (2006.01)
*F01D 11/02* (2006.01)

(52) U.S. Cl.
CPC ........... *F01D 11/001* (2013.01); *F01D 5/066* (2013.01); *F01D 11/02* (2013.01); *F05D 2220/32* (2013.01); *F05D 2240/24* (2013.01)

(58) Field of Classification Search
CPC .............................. F01D 11/001; F01D 11/02
See application file for complete search history.

(56) References Cited

U.S. PATENT DOCUMENTS

| | | | | |
|---|---|---|---|---|
| 3,551,068 A * | 12/1970 | Allen | .................... | F01D 11/008 415/173.7 |
| 4,484,858 A * | 11/1984 | Kurosawa | ............. | F01D 11/005 416/193 A |
| 8,277,172 B2 * | 10/2012 | Tesh | ...................... | F01D 11/001 415/115 |
| 8,282,346 B2 * | 10/2012 | Deodhar | ............... | F01D 11/001 415/174.5 |
| 11,060,615 B2 * | 7/2021 | Morinaka | ............ | F16J 15/4472 |
| 2013/0189097 A1 * | 7/2013 | Ziegler | ................... | F01D 25/06 416/1 |
| 2014/0054863 A1 | 2/2014 | Soundiramourty et al. | | |
| 2015/0083281 A1 * | 3/2015 | Lipkin | ...................... | C22F 1/10 148/563 |
| 2015/0114001 A1 | 4/2015 | Potter et al. | | |
| 2015/0211377 A1 | 7/2015 | Lacy et al. | | |
| 2015/0260294 A1 * | 9/2015 | Nakaniwa | ............ | F04D 29/102 277/414 |
| 2019/0136863 A1 * | 5/2019 | Morinaka | ............... | F01D 11/02 |

* cited by examiner

*Primary Examiner* — Richard A Edgar
*Assistant Examiner* — John S Hunter, Jr.
(74) *Attorney, Agent, or Firm* — Burris Law, PLLC

(57) ABSTRACT

A gas turbine spacer disk includes a disk portion, a rim portion, a first fillet, and a second fillet. The disk portion is disposed about a rotational axis. The rim portion is disposed about the disk portion. An outer face of the rim portion defines a plurality grooves extending circumferentially about the rotational axis. The first fillet transitions from the rim portion to a first side of the disk portion. The second fillet transitions from the rim portion to a second side of the disk portion. The plurality of grooves includes a pair of first grooves having a first diameter and a pair of second grooves having a second diameter that is less than the first diameter. A first one of the first grooves overlaps in an axial direction with the first fillet. A second one of the first grooves overlaps in the axial direction with the second fillet.

20 Claims, 6 Drawing Sheets

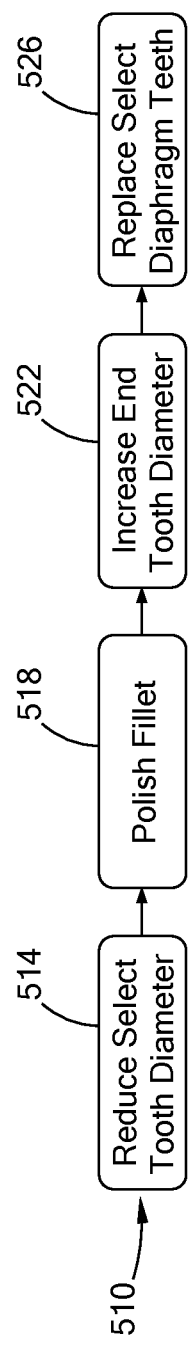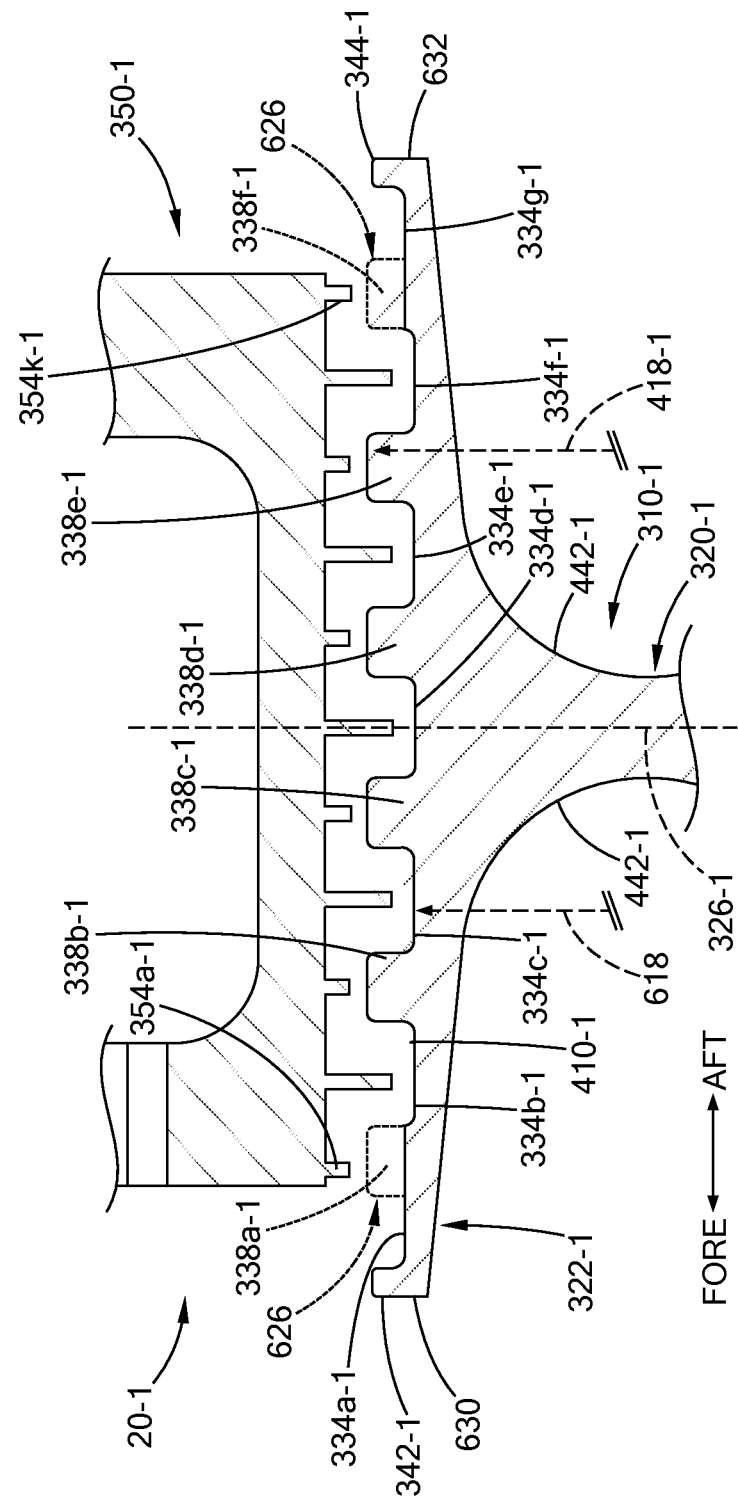

GAS TURBINE AND SPACER DISK FOR GAS TURBINE

FIELD

The present disclosure relates to gas turbine engines and spacer disks for gas turbine engines.

BACKGROUND

The statements in this section merely provide background information related to the present disclosure and may not constitute prior art.

Gas turbine engines, such as those used in power plants or aircraft engines for example, typically include spacer disks axially between stages of turbine blade supporting disks. The spacer disk rotates during operation of the turbine engine. Temperatures and centrifugal forces can cause a rim of the spacer disk to elastically expand in a radially outward direction during operation. Over time, this generally elastic expansion and contraction of the rim may create alternating stress in the spacer disk. In some circumstances, the stress can initiate cracks on an inside surface of the rim, which can limit the operable lifetime of the spacer disk.

The present disclosure addresses these and other issues with typical gas turbine engines.

SUMMARY

This section provides a general summary of the disclosure and is not a comprehensive disclosure of its full scope or all of its features.

In one form, a gas turbine spacer disk includes a disk portion, a rim portion, a first fillet, and a second fillet. The disk portion is disposed about a rotational axis. The rim portion is disposed about the disk portion. An outer face of the rim portion defines a plurality grooves extending circumferentially about the rotational axis. The first fillet transitions from the rim portion to a first side of the disk portion. The second fillet transitions from the rim portion to a second side of the disk portion. The plurality of grooves includes a pair of first grooves having a first diameter and a pair of second grooves having a second diameter that is less than the first diameter. A first one of the first grooves overlaps in an axial direction with the first fillet. A second one of the first grooves overlaps in the axial direction with the second fillet. According to a variety of alternate forms: an entirety of the first one of the first grooves overlaps in the axial direction with the first fillet and an entirety of the second one of the first grooves overlaps in the axial direction with the second fillet; the first one of the first grooves overlaps axially with a transition from the first fillet to the rim portion and the second one of the first grooves overlaps axially with a transition from the second fillet to the rim portion; the plurality of grooves further includes a center groove overlapping in the axial direction with the disk portion; the plurality of grooves further includes a pair of third grooves, each third groove being on opposite axial sides of the disk portion; the plurality of grooves consists of a center groove, the pair of first grooves, the pair of second grooves, and a pair of third grooves, the center groove overlapping in the axial direction with the disk portion, wherein the first one of the first grooves is axially between the center groove and a first one of the second grooves, wherein the second one of the first grooves is axially between the center groove and a second one of the second grooves, wherein the first one of the second grooves is axially between the first one of the first grooves and a first one of the third grooves, wherein the second one of the second grooves is axially between the second one of the first grooves and a second one of the third grooves; a gas turbine engine includes the gas turbine spacer disk and further includes a first stage disk rotatable about the rotational axis and a second stage disk rotatable about the rotational axis, the first and second stage disks being disposed on opposite axial sides of the gas turbine spacer disk; when the gas turbine spacer disk is in a static condition the rim portion and the first stage disk are radially spaced apart to define a first gap therebetween and the rim portion and the second stage disk are radially spaced apart to define a second gap therebetween, the first and second gaps being less than or equal to approximately 0.025 inches (0.635 millimeters), wherein the rim portion is configured to elastically deform under centrifugal force such that the rim portion contacts the first and second stage disks to close the first and second gaps respectively; the gas turbine engine further includes a diaphragm disposed about the gas turbine spacer disk and including a plurality of teeth, each tooth extending radially inward into a corresponding groove of the plurality of grooves to define a tortuous path between the diaphragm and the gas turbine spacer disk; the plurality of teeth includes a pair of first teeth extending into the first grooves and a pair of second teeth extending into the second grooves, wherein the first teeth extend radially inward less than the second teeth.

In another form, a gas turbine spacer disk includes a disk portion and a rim portion. The disk portion is disposed about a rotational axis. The rim portion is disposed about the disk portion. An outer face of the rim portion defines a series of circumferential grooves that alternate in depth along at least an axial width of the rim portion. According to a variety of alternate forms: the gas turbine spacer disk further includes a first fillet transitioning from the rim portion to a first side of the disk portion, and a second fillet transitioning from the rim portion to a second side of the disk portion, wherein the series of circumferential grooves includes a pair of first grooves of a first depth and a pair of second grooves of a second depth greater than first depth, each first groove overlapping in an axial direction with a corresponding one of the first or second fillets; the gas turbine spacer disk further includes a first fillet transitioning from the rim portion to a first side of the disk portion, and a second fillet transitioning from the rim portion to a second side of the disk portion, wherein the series of circumferential grooves includes a pair of first grooves of a first depth and a pair of second grooves of a second depth greater than first depth, an entirety of each first groove overlaps in an axial direction with a corresponding one of the first or second fillets; the gas turbine spacer disk further includes a first fillet transitioning from the rim portion to a first side of the disk portion, and a second fillet transitioning from the rim portion to a second side of the disk portion, wherein the series of circumferential grooves includes a pair of first grooves of a first depth and a pair of second grooves of a second depth greater than first depth, each first groove overlaps in an axial direction with a transition from a corresponding one of the first or second fillet to the rim portion; the series of circumferential grooves includes at least one central groove, a pair of first grooves of a first depth, and a pair of second grooves of a second depth greater than first depth, the central groove being disposed axially between the first grooves, wherein the first grooves are disposed axially between the second grooves; the series of grooves further includes a pair of third grooves, the second grooves being axially between the third grooves.

In yet another form, a gas turbine spacer disk includes a disk portion, a rim portion, a first transition, and a second transition. The disk portion is disposed about a rotational axis. The rim portion is disposed about the disk portion. A radially outermost face of the rim portion is defined by alternating troughs and peaks. The troughs include a pair of first troughs and a pair of second troughs. The first troughs are radially outward of the second troughs. The first transition transitions from the rim portion to a first side of the disk portion. The second transition transitions from the rim portion to a second side of the disk portion. The first troughs are disposed on opposite axial sides of the disk portion and overlap in an axial direction with a corresponding one of the first and second transitions. According to a variety of alternate forms: each first trough is flanked on both sides by an adjacent trough that has a diameter that is less than the first trough; the diameter of the adjacent troughs is the same as a diameter of the second troughs; the first transition includes a first fillet and the second transition includes a second fillet.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a flow chart of a method of modifying a gas turbine engine in accordance with the teachings of the present disclosure;

FIG. 6 is a schematic cross-sectional view of a portion of a gas turbine engine of a second configuration in accordance with the teachings of the present disclosure, illustrating a spacer disk in a modified state and a diaphragm.

Figure 1:
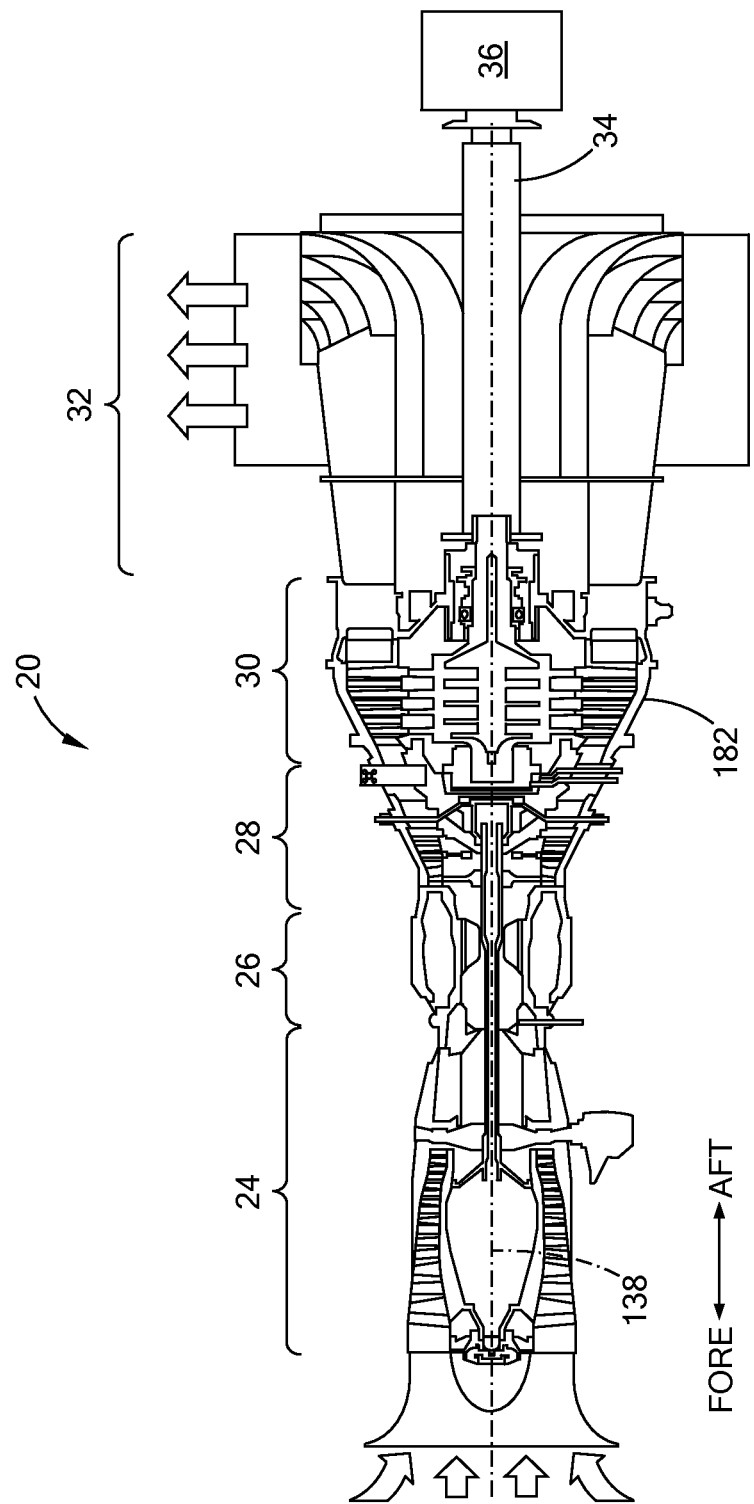
FIG. 1 is a schematic view of a gas turbine engine in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an example gas turbine engine 20 is schematically illustrated. The gas turbine engine 20 includes a compressor section 24, a combustor section 26, a turbine section 28, a power turbine section 30, and an exhaust section 32. In the particular example shown in FIG. 1, the engine 20 is configured as an aeroderivative industrial gas turbine (IGT), though any other suitable configuration may be used. For example, a gas turbine designed specifically for power generation such as, but not limited to, heavy duty or frame type gas turbines (e.g., General Electric 7FA series gas turbines). Although depicted as specific engine architecture in the disclosed non-limiting illustration of FIG. 1, the concepts described herein are not limited to only such architecture as the teachings may be applied to other gas turbine architectures.

The compressor section 24, the combustor section 26, and the turbine section 28 are collectively referred to as a gas generator that is operable to drive the power turbine section 30. In the example provided, the power turbine section 30 drives an output shaft 34 to power a generator 36 or other system. In one non-limiting alternative configuration, the power turbine section 30 includes a free turbine with no physical connection between the gas generator and the power turbine section 30. The generated power maybe thereby a result of mass flow capture by the otherwise free power turbine for example.

Figure 2:
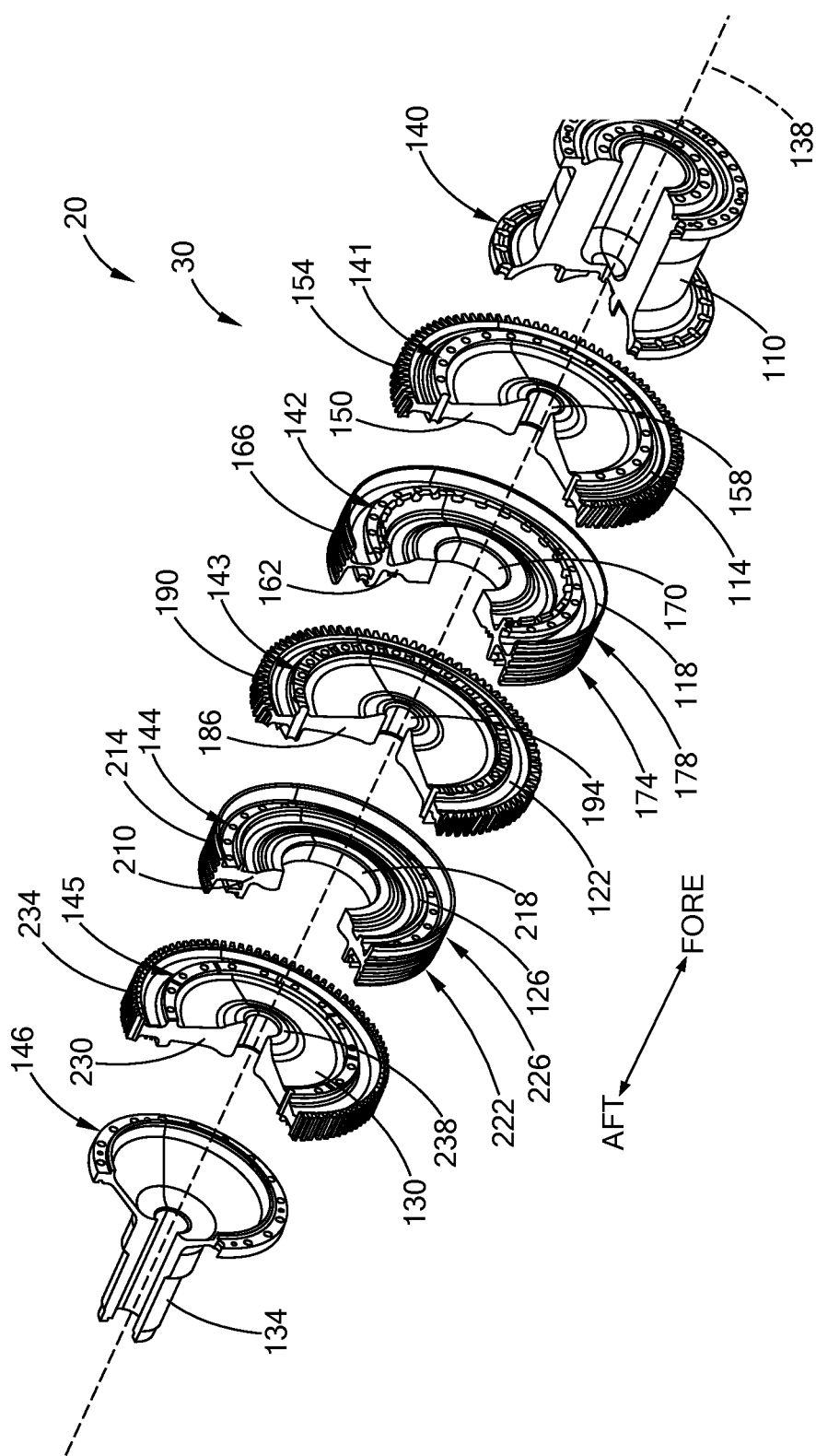
FIG. 2 is a perspective cross-sectional view of a portion of the gas turbine engine of FIG. 1.

Referring to FIG. 2, an example turbine section 28 or power turbine section 30 of the gas turbine engine 20 is illustrated in an exploded and partially cross-sectioned manner for ease of illustration. The example turbine section 28, 30 includes a forward stubshaft 110, a first stage disk 114, a first spacer disk 118 (also referred to as a 1-2 spacer disk), a second stage disk 122, a second spacer disk 126 (also referred to as a 2-3 spacer disk), a third stage disk 130, and an aft stubshaft 134 disposed coaxially about a rotational axis 138 of the gas turbine engine 20. While illustrated and described herein with three stages, more or fewer stages may be used.

The forward stubshaft 110, the first stage disk 114, the first spacer disk 118, the second stage disk 122, the second spacer disk 126, the third stage disk 130, and the aft stubshaft 134 can be coupled together for common rotation about the rotational axis 138 via bolts (not specifically shown) that extend through bores 140, 141, 142, 143, 144, 145, 146 in the forward stubshaft 110, the first stage disk 114, the first spacer disk 118, the second stage disk 122, the second spacer disk 126, the third stage disk 130, and the aft stubshaft 134 respectively.

The first stage disk 114 is generally axially between the forward stubshaft 110 and the first spacer disk 118. The first stage disk 114 has a first stage disk portion 150 and a first stage rim portion 154. The first stage disk portion 150 is an annular body that defines a central aperture 158. The bores 141 are defined in the first stage disk portion 150. The first stage rim portion 154 is fixedly coupled to (e.g., integrally formed with) the first stage disk portion 150 to define the outermost circumference of the first stage disk 114. The first stage rim portion 154 is configured to support a plurality of turbine blades (not specifically shown) extending radially outward therefrom about a circumference of the first stage rim portion 154.

The first spacer disk 118 is generally axially between the first stage disk 114 and the second stage disk 122. The first spacer disk 118 has a first spacer disk portion 162 and a first spacer rim portion 166. The first spacer disk portion 162 is an annular body that defines a central aperture 170. The bores 142 are defined by the first spacer disk portion 162. The first spacer rim portion 166 is fixedly coupled to (e.g., integrally formed with) the first spacer disk portion 162 to define the outermost circumference of the first spacer disk 118. The first spacer rim portion 166 is described in greater detail below, but generally extends axially outward in fore and aft directions from the first spacer disk portion 162 and a radially outward facing side 174 of the first spacer disk 118 defines a plurality of grooves 178 that extend circumferentially about the first spacer rim portion 166. A first diaphragm (not specifically shown) and first nozzle (not specifically shown) with stationary vanes (not specifically shown) can be disposed about the first spacer rim portion 166 and non-rotationally coupled to a boundary wall (e.g., turbine casing 182 shown in FIG. 1) of the gas turbine engine 20. As used herein, the term "fore" shall refer to a direction, relative to the combustor 26 (FIG. 1) and along the rotational axis 138, toward the compressor 24 (FIG. 1). Likewise, the term "aft" shall refer to a direction, relative to the combustor 26 (FIG. 1) and along the rotational axis 138, toward the turbine 28 (FIG. 1).

The second stage disk 122 is generally axially between the first spacer disk 118 and the second spacer disk 126. The second stage disk 122 has a second stage disk portion 186 and a second stage rim portion 190. The second stage disk portion 186 is an annular body that defines a central aperture 194. The bores 143 are defined in the second stage disk portion 186. The second stage rim portion 190 is fixedly coupled to (e.g., integrally formed with) the second stage disk portion 186 to define the outermost circumference of the second stage disk 122. The second stage rim portion 190 is configured to support a plurality of turbine blades (not specifically shown) extending radially outward therefrom about a circumference of the second stage rim portion 190.

The second spacer disk 126 is generally axially between the second stage disk 122 and the third stage disk 130. The second spacer disk 126 has a second spacer disk portion 210 and a second spacer rim portion 214. The second spacer disk portion 210 is an annular body that defines a central aperture 218. The bores 144 are defined by the second spacer disk portion 210. The second spacer rim portion 214 is fixedly coupled to (e.g., integrally formed with) the second spacer disk portion 210 to define the outermost circumference of the second spacer disk 126. The second spacer rim portion 214 is described in greater detail below, but generally extends axially outward in fore and aft directions from the second spacer disk portion 210 and a radially outward facing side 222 of the second spacer disk 126 defines a plurality of grooves 226 that extend circumferentially about the second spacer rim portion 214. A second diaphragm (not specifically shown) and second nozzle (not specifically shown) can be disposed about the second spacer rim portion 214 and non-rotationally coupled to the boundary wall (e.g., boundary wall 182 shown in FIG. 1) of the gas turbine engine 20.

The third stage disk 130 is generally axially between the second spacer disk 126 and the aft stubshaft 134. The third stage disk 130 has a third stage disk portion 230 and a third stage rim portion 234. The third stage disk portion 230 is an annular body that defines a central aperture 238. The bores 145 are defined in the third stage disk portion 230. The third stage rim portion 234 is fixedly coupled to (e.g., integrally formed with) the third stage disk portion 230 to define the outermost circumference of the third stage disk 130. The third stage rim portion 234 is configured to support a plurality of turbine blades (not specifically shown) extending radially outward therefrom about a circumference of the third stage rim portion 234.

Figure 3:
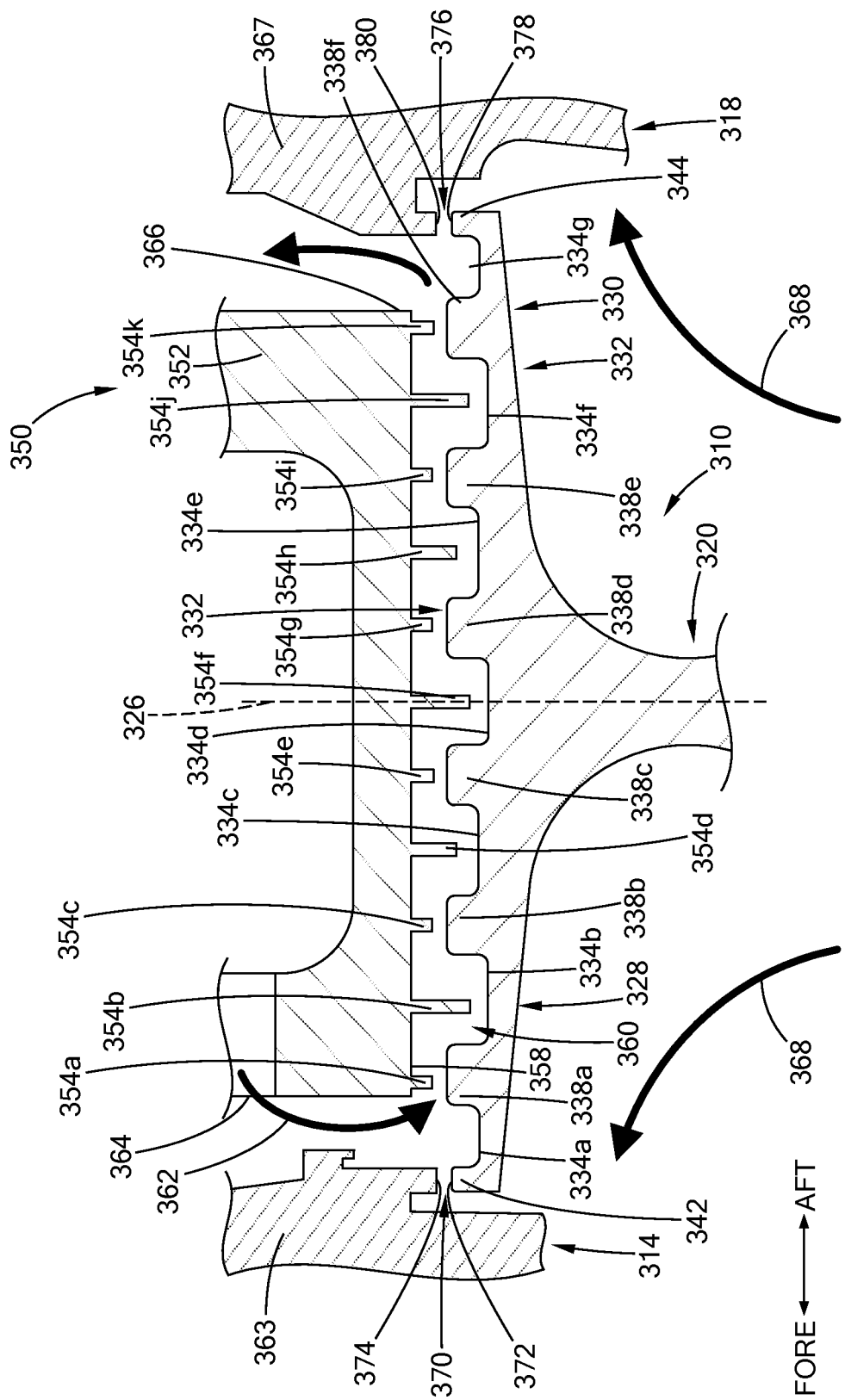
FIG. 3 is a schematic cross-sectional view of a portion of a gas turbine engine in accordance with the teachings of the present disclosure, illustrating a spacer disk, a diaphragm, a forward stage disk, and an aft stage disk in an installed position.

Referring to FIG. 3, a portion of a spacer disk 310, a forward stage disk 314, and an aft stage disk 318 are illustrated in an installed and rotationally stationary condition. The spacer disk 310 can be axially between any two adjacent turbine stage disks of a gas turbine engine (e.g., engine 20). For example, the spacer disk 310 may be the first or second spacer disk 118, 126 (FIG. 2) wherein the forward and aft stage disks 314, 318 are the corresponding first, second, or third stage disks 114, 122, 130 (FIG. 2) on either axial side of the spacer disk 310.

The spacer disk 310 includes a disk portion 320 (e.g., the first or second spacer disk portion 162, 210; FIG. 2) and a rim portion 322 (e.g., the first or second spacer rim portion 166, 214; FIG. 2). As described above, the rim portion 322 is fixedly coupled to (e.g., integrally formed with) the disk portion 320 to define the outermost circumference of the spacer disk 310. The rim portion 322 is generally symmetrical on forward and aft sides of a central plane 326 of the spacer disk 310, the central plane 326 being perpendicular to the rotational axis (e.g., rotational axis 138 shown in FIG. 2). The rim portion 322 includes a forward region 328 that extends axially in the forward direction from the central plane 326 and an aft region 330 that extends axially in the aft direction from the central plane 326.

A radially outward facing side 332 of the rim portion 322 defines a plurality of grooves (e.g., first groove 334a, second groove 334b, third groove 334c, fourth groove 334d, fifth groove 334e, sixth groove 334f, seventh groove 334g; collectively referred to herein as grooves 334) that extend circumferentially about the rim portion 322 and are spaced axially apart by teeth (e.g., first tooth 338a, second tooth 338b, third tooth 338c, fourth tooth 338d, fifth tooth 338e, sixth tooth 338f; collectively referred to herein as teeth 338). In an alternative configuration, not specifically shown, more or fewer numbers of grooves 334 and teeth 338 can be used.

In the example provided, the first groove 334a is the forward most groove 334 and is bound in the forward direction by a forward end tooth 342 and bound in the aft direction by the first tooth 338a, while the seventh groove 334g is the aftmost groove 334 and is bound in the forward direction by the sixth tooth 338f and bound in the aft direction by an aft end tooth 344. In the example provided, the fourth groove 334d is centered on the central plane 326.

A diaphragm 350 is disposed about the rim portion 322 of the spacer disk 310 and non-rotationally coupled to the boundary wall of the gas turbine engine (e.g., turbine casing 182 shown in FIG. 1). The diaphragm 350 includes an annular body 352 and a plurality of teeth (e.g., first diaphragm tooth 354a, second diaphragm tooth 354b, third diaphragm tooth 354c, fourth diaphragm tooth 354d, fifth diaphragm tooth 354e, sixth diaphragm tooth 354f, seventh diaphragm tooth 354g, eighth diaphragm tooth 354h, ninth diaphragm tooth 354i, tenth diaphragm tooth 354j, eleventh diaphragm tooth 354k; collectively referred to herein as diaphragm teeth 354). The diaphragm teeth 354 extend radially inward from a radially inward face 358 of the annular body 352. The diaphragm teeth 354 alternate between opposing the teeth 338 of the rim portion 322 and entering the grooves 334 of the rim portion 322 to form an interstage high-low seal 360. In the example provided, the diaphragm teeth 354 do not touch the rim portion 322.

In the example provided, the first diaphragm tooth 354a opposes the first tooth 338a of the rim portion 322 and the eleventh diaphragm tooth 354k opposes the sixth tooth 338f of the rim portion 322. In the example provided, none of the diaphragm teeth 354 extend into the first groove 334a or the seventh groove 334g.

The diaphragm 350 and rim portion 322 are configured to restrict air flow along the interstage high-low seal 360, defining a first flowpath 362 between diaphragm 350 and rim portion 322. This first flowpath 362 follows a tortuous path from the space between a rim portion 363 of the forward stage disk 314 and a forward side 364 of the diaphragm 350, between the diaphragm teeth 354, and the teeth 338 and grooves 334 of the rim portion 322, to exit between an aft side 366 of the diaphragm 350 and the rim portion 367 of the aft stage disk 318 into the hot gas flowpath. The interstage high-low seal 360 is designed to restrict and reduce a flow of the hot gas path around a vane (not specifically shown) attached to, and disposed radially outward from, the diaphragm 350.

Second flowpaths 368 represent air within the wheel space below the first and second stage blades and second stage vanes (not specifically shown) that flow radially outward toward the rim portions 363, 322, 367 of the forward stage disk 314, the spacer disk 310, and the aft stage disk 318 and flow into apertures (not shown) in the forward and aft stage disks 314, 318 to cool the blades (not shown) of the forward and aft stage disks 314, 318. Ideally, the second flowpaths 368 are maintained at a pressure higher than the first flowpath 362, to inhibit ingestion into the wheel space of the hot gas path air from the first flowpath 362.

A gap 370 is defined between a radially outward facing surface 372 (also referred to herein as a peak or landing) of the forward end tooth 342 and a radially inward facing surface 374 of the rim portion 363 of the forward stage disk 314 to facilitate installation. Similarly, a gap 376 is defined between a radially outward facing surface 378 (also referred to herein as a peak or landing) of the aft end tooth 344 and a radially inward facing surface 380 of the rim portion 367 of the aft stage disk 318. In the example provided, the gaps 370, 376 are approximately 0.025 inches (0.635 millimeters).

Figure 4:
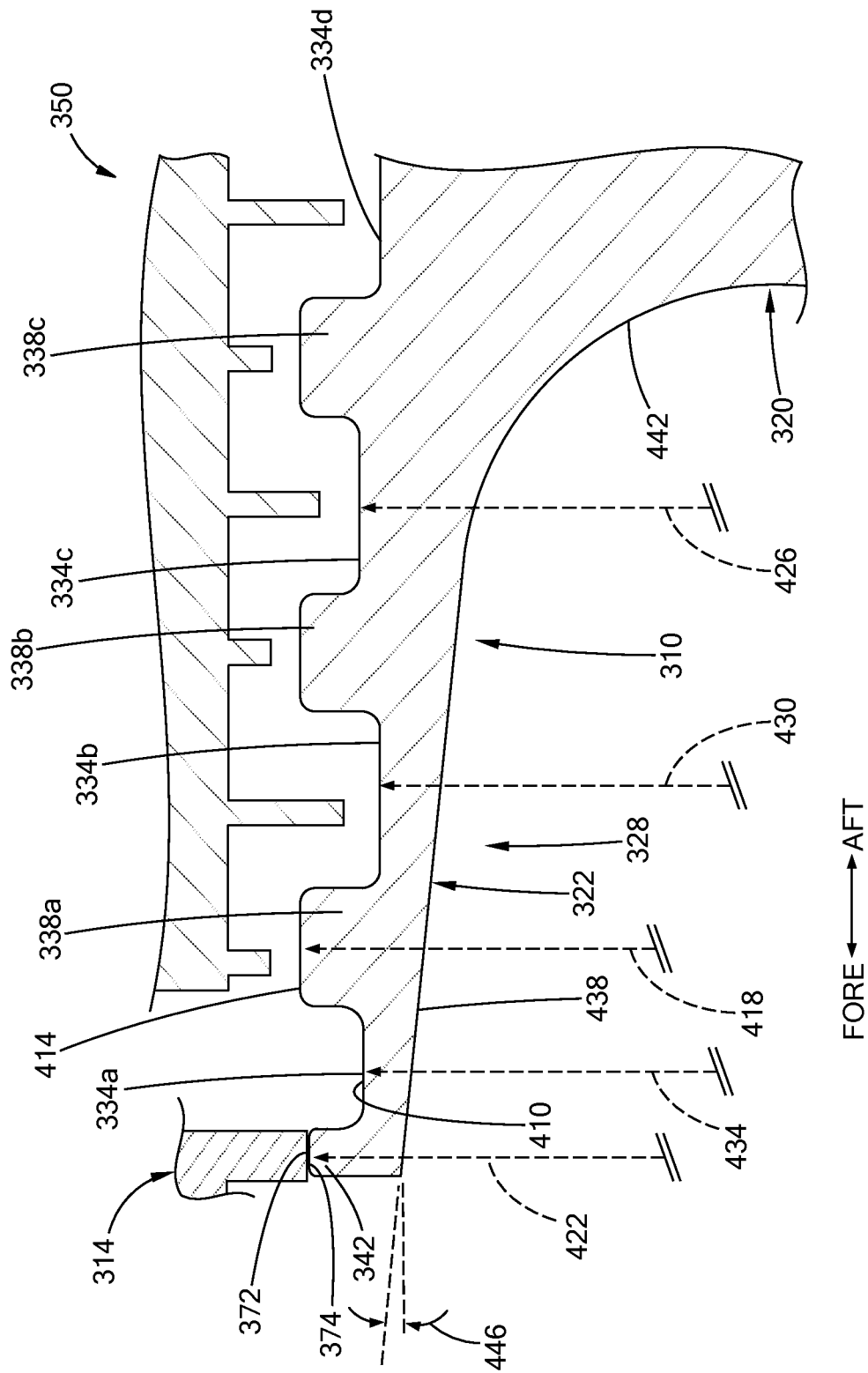
FIG. 4 is a schematic cross-sectional view of a portion of the spacer disk, the diaphragm, and the forward stage disk of FIG. 3, illustrated in an operating condition.

Referring to FIGS. 3 and 4, during operation, the spacer disk 310 rotates and centrifugal force of the rim portion 322 of the spacer disk 310 causes the rim portion 322 at the forward end tooth 342 to elastically deform radially outward until the forward end tooth 342 contacts the radially inward facing surface 374 of the forward stage disk 314. Similarly, centrifugal force causes the rim portion 322 at the aft end tooth 344 to elastically deform radially outward until the aft end tooth 344 contacts the radially inward facing surface 380 of the aft stage disk 318. This contact between the spacer disk 310 and the forward and aft stage disks 314, 318 forms a seal therebetween and inhibits mixture of hot gas path air with cooling air the first and second flowpaths 362, 368, respectively.

Referring specifically to FIG. 4, each groove 334 has a corresponding trough 410 (also referred to herein as a landing) that faces radially outward and is recessed radially inward relative to peaks 414 (also referred to herein as landings) of the teeth 338. In the example provided, the peaks 414 of the teeth 338 all have a common diameter 418. In the example provided, the radially outward facing surface 372 of the forward end tooth 342 has a diameter 422 that may be equal to, less than, or greater than the diameter 418 of the teeth 338.

In the example provided, the trough 410 of the third groove 334c has a first diameter 426 and the troughs 410 of the second and fourth grooves 334b, 334d have a second diameter 430 that is less than the first diameter 426. In other words, the grooves 334 alternate in depth from the second groove 334b to the fourth groove 334d. In the example provided, the first diameter 426 is greater than the second diameter 430 by approximately 0.25 inches (6.35 millimeters), though other configurations can be used. In the example provided, the trough 410 of the first groove 334a has a third diameter 434 that is greater than the second diameter 430 and may be equal to, less than, or greater than the first diameter 426. In the example provided, the grooves 334 are generally symmetrical across the central plane 326 such that the fifth groove 334e (FIG. 3) is similar to the third groove 334c and has the first diameter 426, the sixth groove 334f is similar to the second groove 334b and has the second diameter 430, and the seventh groove 334g is similar to the first groove 334a and has the third diameter 434. Likewise, the teeth 338 and 342, 344 are generally symmetrically disposed across the central plane 326.

The rim portion 322 has an interior surface 438 that generally faces radially inward and transitions into the disk portion 320. In the example provided, the interior surface 438 transitions to the disk portion 320 by way of a fillet 442. In the example provided, the fillet 442 is a simple radius fillet. In an alternative configuration, not specifically shown, the fillet 442 may be an elliptical fillet or a complex radius fillet such that the radius changes from the interior surface 438 to the disk portion 320. In the example provided, the interior surface 438 is angled at an angle 446 of approximately 8.5° relative to the rotational axis 138 (FIG. 2), though other angles may be used. The interior surface 438 can meet the fillet 442 tangentially. While the interior surface 438 and the fillet 442 are shown and described herein with reference to FIG. 4, which illustrates the transition from the forward region 328 of the rim portion 322 to the disk portion 320, the aft region 330 (FIG. 3) transitions to the disk portion 320 similarly.

In the example provided, the third groove 334c overlaps in the axial direction with the fillet 442. In the example provided, an entire axial width of the third groove 334c overlaps with the fillet 442, though other configurations can be used. In an alternative configuration, not specifically shown, the third groove 334c overlaps axially with a portion of the fillet 442 and a portion of the interior surface 438. As described above, the fifth groove 334e (FIG. 3) is generally symmetrically disposed across the central plane 326 (FIG. 3). Thus, the fifth groove 334e (FIG. 3) overlaps with the fillet 442 that transitions the aft region 330 (FIG. 3) to the disk portion 320 (FIG. 3).

The greater diameter at the third groove 334c (and the fifth groove 334e) adds thickness and rigidity in an area of maximum stresses during elastic expansion of the rim portion 322 (i.e., proximate to the transition from the rim portion 322 to the disk portion 320). Thus, stresses in this area are reduced. It will be appreciated by one of skill in the art that conventional design approaches would seek to avoid use of a greater diameter at any one or more of the grooves 334 (e.g., the third groove 334c) as doing so would tend to decrease the effectiveness of the interstage high-low seal 360 and increase complexity and costs.

Figure 7:
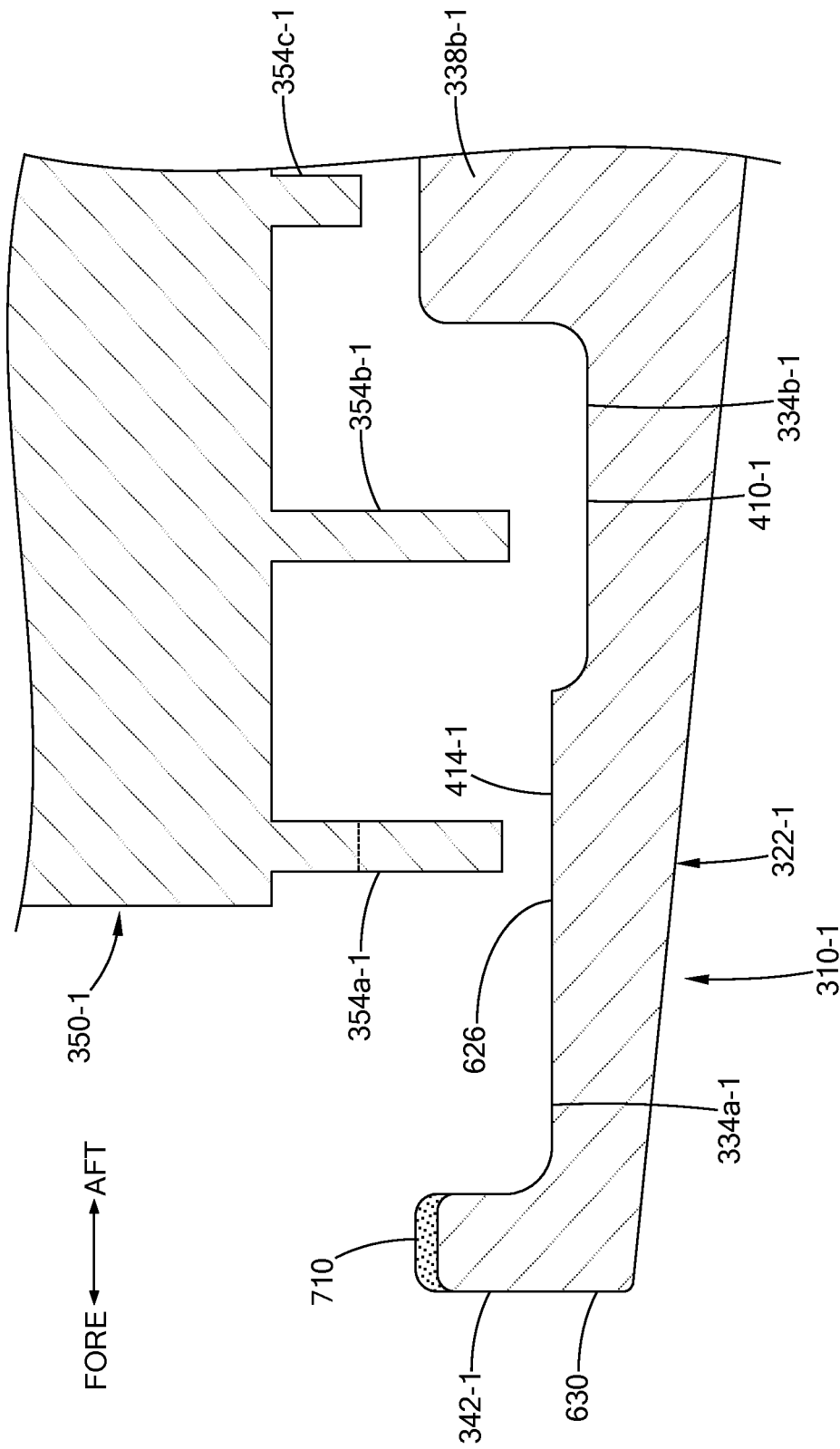
FIG. 7 is a schematic cross-sectional view of a portion the spacer disk of FIG. 6 and the diaphragm in a modified state.

Referring to FIGS. 5-7, a method 510 of modifying a gas turbine engine 20-1 is described. The gas turbine engine 20-1 can be similar to the gas turbine engines described above with reference to FIGS. 1-4 (e.g., engine 20) except as otherwise shown or described herein. As such, similar features are shown and described herein with similar reference numerals but followed by a dash 1 (i.e., "-1") and their descriptions are not repeated in detail.

The gas turbine engine 20-1 includes a spacer disk 310-1 and a diaphragm 350-1, which can be similar to the spacer disk 310 and diaphragm 350 of FIGS. 3 and 4, except as otherwise shown and described herein. In the example provided, the troughs 410-1 of the second, third, fourth, fifth, and sixth grooves 334b-1, 334c-1, 334d-1, 334e-1, 334f-1 may all have a common diameter 618. In an alternative configuration, not specifically shown, they may be at different diameters. In the example provided, the teeth 338-1

(including the first and sixth teeth 338*a*-1, 338*f*-1 that are illustrated in dashed lines in FIG. 6) all have the common diameter 418-1 before the modification described below.

At step 514, and with specific reference to FIG. 6, the diameter of a selected pair 626 of the teeth 338-1 is reduced in order to reduce the mass of the rim portion 322-1 proximate to the axial ends 630, 632 to reduce load and redistribute the stresses due to radial expansion of the rim portion 322-1 during operation. In the example provided, the selected pair 626 includes the first and sixth teeth 338*a*-1, 338*f*-1, though other pairs that are generally symmetrically disposed across the central plane 326-1 can be reduced in addition to or in the alternative thereto. This reduction of diameter can be done using any suitable method. Some non-limiting examples include machining the selected pair 626 on a lathe (not shown) or a mill (not shown) or grinding the selected pair 626.

In the example provided, the selected pair 626 are reduced such that the peaks 414-1 of the selected pair 626 are flush with the troughs 410-1 of the first and seventh grooves 334*a*-1, 334*a*-1, effectively removing the selected pair 626 of the teeth 338-1, though other finished diameters can be used.

At step 518, the fillets 442-1 are polished. In the example provided, the fillets 442-1 are polished to a surface finish of 16 microinches (0.4064 micrometers) or smoother. In the example provided, the fillets 442-1 are then shot peened after polishing. This polishing and/or shot peening reduces locations of stress concentration and possible crack initiation to reduce cracking during radial expansion of the rim portion 322-1 during operation.

At step 522, and with specific reference to FIG. 7, the diameter of the forward end tooth 342-1 is increased. In the example provided, a coating 710 is applied to the forward end tooth 342-1 to increase its diameter. In the example provided, the diameter is increased by 0.020 inches (0.508 millimeters). The diameter of the aft end tooth 344-1 (shown in FIG. 6) is similarly increased. This increase in diameter limits radial expansion of the rim portion 322-1 during operation such that the rim portion 322-1 contacts the radially inward facing surface 374 (FIGS. 3 and 4) with less radial expansion of the rim portion 322-1.

At step 526, and with specific reference to FIG. 7, the length of the diaphragm teeth 354-1 that oppose the selected pair 626 is increased such that they extend further radially inward. In FIG. 7, the original length of the diaphragm tooth 354*a*-1 is shown in dashed lines. In the example provided, the lengths of the first diaphragm tooth 345*a*-1 and the eleventh diaphragm tooth 338*k*-1 (FIG. 6) are increased. In one non-limiting example, the diaphragm teeth 354-1 that oppose the selected pair 626 can be removed and replaced with annular brush seals.

The steps 514, 518, 522, 526 of the method 510 can be performed in any order and do not need to be performed in the specific order in which they are described herein or shown in FIG. 5.

In the example provided, the steps 518, 522, 526 are optional such that any one or more may be omitted. In an alternative configuration, step 518 is performed and steps 514, 522, and 526 are optional such that any one or more may be omitted, though it is understood that step 526 is done only when step 514 is also done. In yet another alternative configuration, step 522 is performed and steps 514, 518, and 526 are optional such that any one or more may be omitted, though it is understood that step 526 is done only when step 514 is also done.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A gas turbine spacer disk comprising:
   a disk portion disposed about a rotational axis;
   a rim portion disposed about the disk portion, an outer face of the rim portion defining a plurality grooves and a plurality of teeth, the plurality of grooves and the plurality of teeth extending circumferentially about the rotational axis, each groove of the plurality of grooves being separated from each other groove of the plurality of grooves by a corresponding tooth of the plurality of teeth such that each groove of the plurality of grooves is recessed radially inward from a corresponding pair of the teeth of the plurality of teeth;
   a first fillet transitioning from the rim portion to a first side of the disk portion; and
   a second fillet transitioning from the rim portion to a second side of the disk portion,
   wherein the plurality of grooves includes a pair of first grooves having a first diameter and a pair of second grooves having a second diameter that is less than the first diameter, a first one of the first grooves overlapping in an axial direction with the first fillet, a second one of the first grooves overlapping in the axial direction with the second fillet.

2. The gas turbine spacer disk according to claim 1, wherein an entirety of the first one of the first grooves overlaps in the axial direction with the first fillet and an entirety of the second one of the first grooves overlaps in the axial direction with the second fillet.

3. The gas turbine spacer disk according to claim 1, wherein the first one of the first grooves overlaps axially with a transition from the first fillet to the rim portion and the second one of the first grooves overlaps axially with a transition from the second fillet to the rim portion.

4. The gas turbine spacer disk according to claim 1, wherein the plurality of grooves further includes a center groove overlapping in the axial direction with the disk portion.

5. The gas turbine spacer disk according to claim 1, wherein the plurality of grooves further includes a pair of third grooves, each third groove being on opposite axial sides of the disk portion.

6. The gas turbine spacer disk according to claim 1, wherein the plurality of grooves consists of a center groove, the pair of first grooves, the pair of second grooves, and a pair of third grooves, the center groove overlapping in the axial direction with the disk portion, wherein the first one of the first grooves is axially between the center groove and a first one of the second grooves, wherein the second one of the first grooves is axially between the center groove and a second one of the second grooves, wherein the first one of the second grooves is axially between the first one of the first grooves and a first one of the third grooves, wherein the second one of the second grooves is axially between the second one of the first grooves and a second one of the third grooves.

7. A gas turbine engine including the gas turbine spacer disk according to claim 1 and further comprising:
a first stage disk rotatable about the rotational axis; and
a second stage disk rotatable about the rotational axis, the first and second stage disks being disposed on opposite axial sides of the gas turbine spacer disk.

8. The gas turbine engine according to claim 7, wherein when the gas turbine spacer disk is in a static condition the rim portion and the first stage disk are radially spaced apart to define a first gap therebetween and the rim portion and the second stage disk are radially spaced apart to define a second gap therebetween, the first and second gaps being less than or equal to 0.025 inches (0.635 millimeters).

9. The gas turbine engine according to claim 7, further comprising a diaphragm disposed about the gas turbine spacer disk, the diaphragm including a plurality of teeth, each tooth of the plurality of teeth of the diaphragm extending radially inward into a corresponding groove of the plurality of grooves to define a tortuous path between the diaphragm and the gas turbine spacer disk.

10. The gas turbine engine according to claim 9, wherein the plurality of teeth of the diaphragm includes a pair of first teeth extending into the first grooves and a pair of second teeth extending into the second grooves, wherein the first pair of teeth extend radially inward less than the second pair of teeth.

11. A gas turbine spacer disk comprising:
a disk portion disposed about a rotational axis; and
a rim portion disposed about the disk portion, an outer face of the rim portion defining a series of circumferential grooves that alternate in depth along at least an axial width of the rim portion, the grooves of the series of circumferential grooves being separated from one another by corresponding seal lands, the grooves of the series of circumferential grooves being recessed radially inward of the corresponding seal lands.

12. The gas turbine spacer disk according to claim 11 further comprising:
a first fillet transitioning from the rim portion to a first side of the disk portion; and
a second fillet transitioning from the rim portion to a second side of the disk portion,
wherein the series of circumferential grooves includes a pair of first grooves of a first depth and a pair of second grooves of a second depth greater than first depth, each first groove overlapping in an axial direction with a corresponding one of the first or second fillets.

13. The gas turbine spacer disk according to claim 11, further comprising:
a first fillet transitioning from the rim portion to a first side of the disk portion; and
a second fillet transitioning from the rim portion to a second side of the disk portion,
wherein the series of circumferential grooves includes a pair of first grooves of a first depth and a pair of second grooves of a second depth greater than first depth, an entirety of each first groove overlaps in an axial direction with a corresponding one of the first or second fillets.

14. The gas turbine spacer disk according to claim 11, further comprising:
a first fillet transitioning from the rim portion to a first side of the disk portion; and
a second fillet transitioning from the rim portion to a second side of the disk portion,
wherein the series of circumferential grooves includes a pair of first grooves of a first depth and a pair of second grooves of a second depth greater than first depth, each first groove overlaps in an axial direction with a transition from a corresponding one of the first or second fillet to the rim portion.

15. The gas turbine spacer disk according to claim 11, wherein the series of circumferential grooves includes at least one central groove, a pair of first grooves of a first depth, and a pair of second grooves of a second depth greater than first depth, the central groove being disposed axially between the first grooves, wherein the first grooves are disposed axially between the second grooves.

16. The gas turbine spacer disk according to claim 15, wherein the series of circumferential grooves further includes a pair of third grooves, the second grooves being axially between the third grooves.

17. A gas turbine spacer disk comprising:
a disk portion disposed about a rotational axis;
a rim portion disposed about the disk portion, a radially outermost face of the rim portion defined by alternating troughs and peaks such that the troughs are separated from one another in an axial direction by corresponding peaks of the peaks, wherein the troughs include a pair of first troughs and a pair of second troughs, the first troughs being radially outward of the second troughs;
a first transition from the rim portion to a first side of the disk portion; and
a second transition from the rim portion to a second side of the disk portion,
wherein the first troughs are disposed on opposite axial sides of the disk portion and overlap in the axial direction with a corresponding one of the first and second transitions.

18. The gas turbine spacer disk according to claim 17, wherein each first trough is flanked on both sides by an adjacent trough of the troughs that has a diameter that is less than the first trough.

19. The gas turbine spacer disk according to claim 18, wherein the diameter of the adjacent troughs is the same as a diameter of the second troughs.

20. The gas turbine spacer disk according to claim 17, wherein the first transition includes a first fillet and the second transition includes a second fillet.

* * * * *